United States Patent [19]
Symonds

[11] Patent Number: 6,163,139
[45] Date of Patent: Dec. 19, 2000

[54] BOOST CONVERTER WITH REDUCED SWITCHING LOSS

[75] Inventor: Neil S. Symonds, Oak Park, Calif.

[73] Assignee: N2Power Inc., Westlake Village, Calif.

[21] Appl. No.: 09/465,652

[22] Filed: Dec. 17, 1999

Related U.S. Application Data

[60] Provisional application No. 60/113,944, Dec. 21, 1998.

[51] Int. Cl.[7] .............................. G05F 1/10; G05F 1/652; G05F 1/24
[52] U.S. Cl. ........................ 323/222; 323/344; 323/259; 363/21
[58] Field of Search .................................. 323/222, 259, 323/344; 363/20, 21

[56] References Cited

U.S. PATENT DOCUMENTS

| | | | |
|---|---|---|---|
| 5,408,403 | 4/1995 | Nerone et al. | 363/37 |
| 5,410,467 | 4/1995 | Smith et al. | 363/131 |
| 5,434,768 | 7/1995 | Jitaru et al. | 363/21 |
| 5,477,131 | 12/1995 | Gegner | 323/222 |
| 5,500,576 | 3/1996 | Russell et al. | 315/307 |
| 5,568,041 | 10/1996 | Hesterman | 323/207 |
| 5,614,810 | 3/1997 | Nostwick et al. | 323/207 |
| 5,880,940 | 3/1999 | Poon | 363/20 |
| 6,008,630 | 12/1999 | Prasad | 323/222 |
| 6,023,132 | 2/2000 | Crouse et al. | 315/307 |

OTHER PUBLICATIONS

Andreycak, W. 1997 & No Month pp. 3–235 thru 3–249.
Bazinet, John and John A. O'Connor, "Analysis and Design of a Zero Voltage Transition Power Factor Correction Circuit," IEEE 1994 Applied Power Electronics Conference and Exposition, pp. 591–597 (May 1994).
Noon, James P., "UC3855A/B High Performance Power Factor Preregulator," Unitrode Corporation Application Note U–153, pp. 3–460 to 3–479, No date.
Bill Andreyczk, No date, pp. 3–235 thru 3–249.

*Primary Examiner*—Peter S. Wong
*Assistant Examiner*—Bao Q. Vu
*Attorney, Agent, or Firm*—Gregory L. Roth

[57] ABSTRACT

A low power loss boost converter of the discontinuous conduction type includes an inductor coupled between the boost converter input and a junction, a current rectifier coupled between the junction and the converter output, a switch coupled between the junction and common, and a switch capacitor coupled in parallel with the switch, the inductor and an energy storage capacitance associated with the input. The switch is alternately opened and closed in switching cycles which alternately energize the inductor and transfer the energy to the output load. Power losses are reduced by providing switch closure at a near zero voltage and current switch conditions produced by a circuit resonance. The capacitor reduces voltage across the switch during the switch open transient condition.

21 Claims, 2 Drawing Sheets

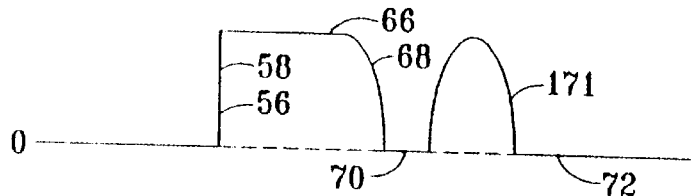
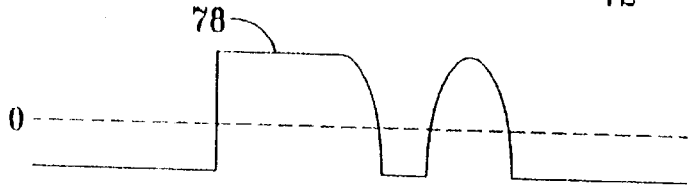
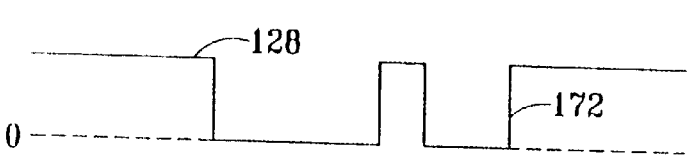
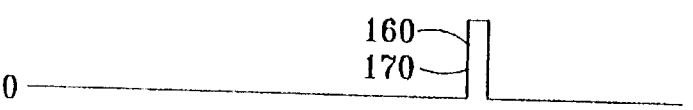
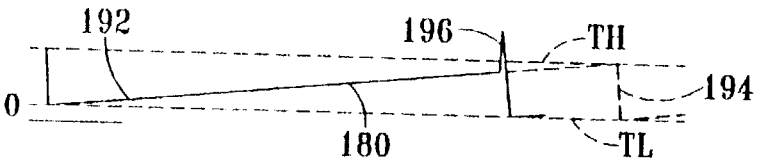
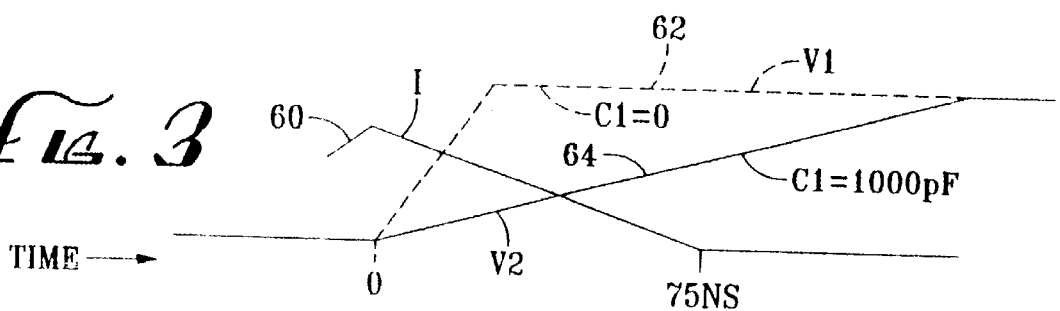

BOOST CONVERTER WITH REDUCED SWITCHING LOSS

CROSS REFERENCE TO RELATED APPLICATION

This application is a continuation of provisional application 60/113,944 filed Dec. 21, 1998.

BACKGROUND OF THE INVENTION

Boost converters are used to provide power factor correction and to increase the magnitude of a DC voltage at a power output relative to a DC voltage at a power input. Typically the voltages at both the input and output are not closely regulated and may vary considerably in instantaneous magnitude. However, these input and output voltages have a substantial average DC component and it is common to refer to them as DC voltage signals.

A boost converter operates by connecting an input voltage through an inductor and then a diode to the output. Filter capacitors are usually provided between both the input and common and the output and common to stabilize and hold the DC voltages at both locations. A power switch, which is typically a MOSFET, is connected to shunt current from the junction of the inductor and diode to common, which may be neutral or ground. When the switch is closed the inductor begins conducting current to common and stores energy as the current magnitude increases. When the switch is opened, the stored energy of the inductor provides current to the converter output at a voltage greater than the input voltage. A control circuit controls the duty cycle or percentage of time during which the switch is closed in a feedback loop that is responsive to the output voltage to maintain the output voltage at a desired magnitude.

Boost converters have numerous applications in switching power supplies, but exhibit reduced efficiencies because of power losses that occur in the boost converters. A large source of power loss is the conversion of electrical energy to heat energy during the switching transient as the switch changes between conducting and nonconducting states.

Boost converters may be divided into two categories according to their operating characteristics. A continuous conduction converter maintains a continuous non-zero current in the inductor. Before the inductor current falls to zero the switch is turned on to increase the energy stored by the inductor and the current therethrough. It is usually found more cost effective to use a continuous conduction converter at power levels above 250 watts. The continuous conduction converter experiences less steady state conduction loss because the RMS current in the switch is lower when the current does not fall to zero during each cycle. However, the continuous conduction converter experiences significant transient power losses at both turn-on and turn-off of the power switch. At turn on the switch has the full output voltage across it until the switch current rises to the magnitude of the inductor current, while during turn-off the voltage across the switch rises to the level of the output voltage much faster than the current drops to zero. Since transient power losses in the switch are proportional to the product of instantaneous voltage and instantaneous current, the simultaneous occurrence of substantial current through the switch and substantial voltage across the switch results in significant power losses.

In contrast, a discontinuous conduction converter does not close the switch until after the diode current has dropped to zero. A discontinuous conduction converter is usually more cost effective in applications below 250 watts, has a higher steady state conduction loss and has a substantial transient turn off loss. However, the turn on loss can be reduced by turning on the power switch under near zero current, near zero voltage conditions that minimize the turn on power loss. Although it is known to use a discontinuous boost converter under conditions that reduce the power loss therein compared to a continuous converter, conventional discontinuous boost converters still experience substantial power losses and a need exists to reduce these power losses even further.

SUMMARY OF THE INVENTION

A boost converter in accordance with the invention is of the discontinuous conduction type and reduces power losses by providing switch turn on (closure) at or near zero voltage and current conditions while reducing the voltage across the power switch during the power turn off (open) switching transient. The boost converter includes a large current power circuit conducting current from the input to the output at an increased voltage, a resonant circuit that provides periodic intervals of near zero voltage across the switch and increases the voltage rise time at switch turn off and a control circuit that regulates the output voltage by controlling the switch duty cycle, that synchronizes switch turn on to a near zero voltage condition and that synchronizes the switch cycles with an external clock synchronization signal.

The power circuit includes an inductor coupled between the boost converter input and a junction, a current rectifier coupled between the junction and the converter output and a switch coupled between the junction and common, which is typically ground or neutral. The switch is alternately opened and closed in switching cycles which alternately energize the inductor and transfer the inductor energy to the output load.

The resonant circuit includes a switch capacitor coupled in parallel with the switch, the inductor and an energy storage capacity associated with the input. The energy storage capacity may be provided by a device (such as a full wave rectifier for AC line power) providing energy to the input, by a capacitor coupled between the input and common or by both. The resonant circuit creates a resonance in the junction voltage that causes the voltage across the switch to achieve a low magnitude condition and preferably a zero or near zero magnitude condition following switch turn off. In addition to enabling a resonance of the junction voltage which appears across the switch, the switch capacitor causes this junction voltage to rise more slowly during switch turn off, thereby significantly decreasing the power dissipation of the switch during power turn off.

The control circuit responds to feedback signals indicating junction voltage, switch current and output voltage as well as a timing synchronization signal such a clock signal from a regulated power supply receiving energy from the boost converter. The control circuit includes a pulse width modulation duty cycle controller that responds to the received feedback signals and the timing synchronization signal to control the on and off cycling of the switch with a duty cycle that maintains a desired output voltage while maintaining synchronism with the timing synchronization signal and turning the switch on during a low or near zero junction voltage condition.

BRIEF DESCRIPTION OF THE DRAWINGS

A better understanding of the invention may be had from a consideration of the following Detailed Description, taken together with the accompanying drawings in which:

FIGS. 2A through 2H are waveforms that are useful in understanding the operation of the boost converter shown in FIG. 1; and FIG. 3 is a set of waveforms that are useful for understanding the operation of the boost converter shown in FIG. 1 during a current turn off transient.

DETAILED DESCRIPTION

Figure 1:
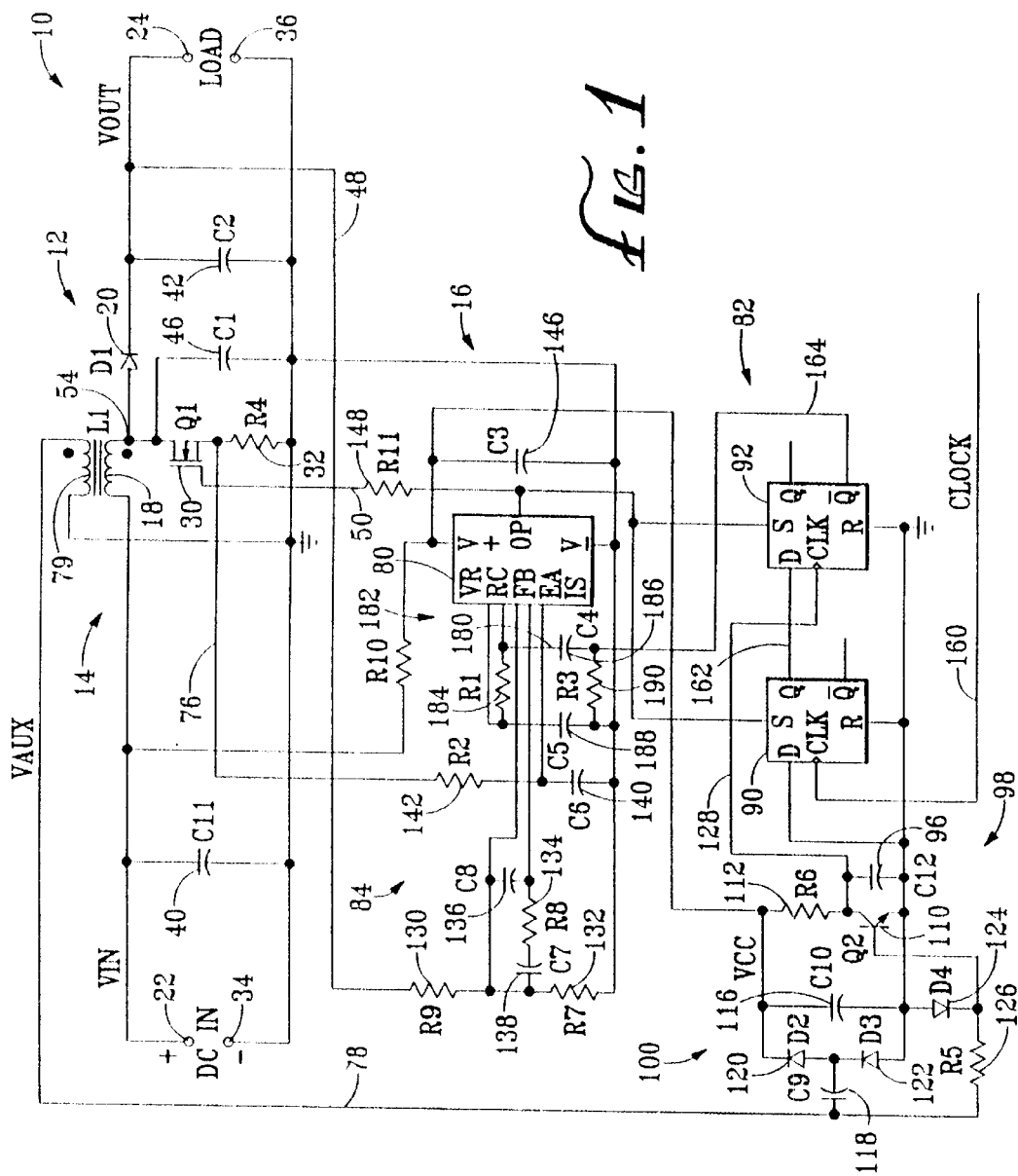
FIG. 1 is a schematic and block diagram representation of a boost converter circuit with reduced switching loss in accordance with the invention.

Referring now to FIG. 1, a discontinuous inductor current boost converter 10 in accordance with the invention includes a large current circuit 12, a resonant circuit 14 and a control circuit 16. The large current circuit 12 includes an inductor L1 18 and a diode D1 20 coupled to conduct current from the positive terminal 22 of the DC input, DC IN, to the positive terminal 24 of the DC output or LOAD which is to receive current at an increased or boosted voltage relative to the voltage at the input 22. A switch Q1 30 and a current sense resistor R4 32 are coupled in series between a junction 54 of the inductor 18 and the diode 20 and common, which in this case is ground, and which in turn connects to the negative input terminal 34 and to the negative output or LOAD terminal 36. In this example, switch 30 is an electronic MOS-FET (Metal Oxide Semiconductor-Field Effect Transistor) switch having its drain connected to the junction 54 of inductor 18 and diode 20 and its source coupled through current sense resistor 32 to ground. Capacitors C11 40 and C2 42 are connected respectively across the DC input terminals 22, 34 and the DC output terminals 24, 36 to provide energy storage and supply capacity in the event that such energy storage and supply capacity is not provided by the input and load circuits themselves. By storing or supplying energy as needed, capacitors 40 and 42 serve as a low pass filter to stabilize the input and output voltages. Capacitors 40 and 42 may not be needed if the circuitry of the input circuit and load provide sufficient energy storage.

Resonant circuit 14 is formed by the interaction of inductor 18 and a capacitor C1 46 with capacitor 40 or the equivalent energy storage capacity of the DC input circuit. Capacitor 46 is connected between the junction 54 of switch 30 and diode 20 and ground and is thus coupled in parallel with switch 30 and current sensing resistor 32. Capacitor 46 substantially reduces switching losses by enabling switch 30 to switch between conducting and nonconducting states with relatively low voltages across the switch 30. Control circuit 16 controls the opening and closing of switch 30.

The boost converter 10 operates by cyclically opening and closing switch 30. When switch 30 is closed inductor 18 is effectively coupled between input terminal 22 and ground, causing inductor 18 to store energy in its magnetic field as current flow through the inductor 18 increases. When switch 30 is opened to stop current flow therethrough, the stored energy of inductor 18 causes current to flow through diode 20 to storage capacitor 42 and output terminal 24. The duty cycle of switch 30 is controlled to maintain output terminal 24 at a desired or preset output voltage which is greater than the input voltage at terminal 22. As the output voltage drops below a selected voltage, control circuit 16 causes switch 30 to stay closed for a longer period of time while the switch current increases. This causes inductor 18 to store more energy while switch 30 is closed and supply more energy to the output when switch 30 opens. As the output voltage rises above the selected voltage, control circuit 16 causes switch 30 to close for a shorter period of time with a smaller switch current and consequently to supply less energy to the output terminal 24 during each cycle.

Control circuit 16 provides a substantially constant on off switching cycle for switch 30 and a variable on or closed time that varies in response to an output voltage feedback signal 48. Control circuit 16 thus varies the duty cycle of switch 30 to control the percentage of each cycle that switch 30 remains closed to thereby control the energy stored by inductor 18 and provided to the output during each switch cycle and consequently the output voltage at terminal 24.

Making further reference now to the waveforms shown in FIGS. 2A and 2B, control circuit 16 generates a switch control signal 50 (FIG. 2A) that goes high to turn on switch 30 at time zero. As switch 30 is turned on, a voltage signal 58 at the drain of switch 30 (FIG. 2B), which is also the junction 54 of inductor 18 and diode 20, is already at or near zero volts and is clamped at or near zero volts by turning on switch 30. Since switch 30 is switched on with a low voltage across switch 30, the off to on switching transient produces minimal power loss in switch 30.

As switch 30 is turned off at time 56 determined by control circuit 16 and control signal 50, the junction voltage 58 rapidly rises to a voltage slightly greater than the output voltage at output terminal 24 to allow inductor 18 to use its stored energy to supply current through diode 20 to capacitor 42 and output terminal 24.

At the start of the on to off switching transient for switch 30, switch 30 has a substantial current therethrough and near zero voltage across it. Capacitor 46 operates at this time to appreciably slow the rise in voltage across switch 30 as it is turned off and the switch current decays toward zero. Switch 30 thus switches under a low voltage condition and switch 30 experiences low energy dissipation and loss during the on to off switching transient as well as the off to on switching transient.

Reference is now made to FIG. 3, which shows the on to off switching transient on an expanded time scale. Curve 60 shows the current I through switch 30, which reaches a peak when switch 30 is turned off at a time designated time zero in FIG. 3. The switch current decays to a low magnitude near zero ampere in about 75 nsec. Curve 62 depicts the voltage V1 across switch 30 during turnoff without capacitor 46. The parasitic capacitance of switch 30 prevents the rise time from being instantaneous, but the voltage rise is relatively steep. The switch 30 thus experiences substantial voltage and current at the same time and consequently a substantial power loss during the switching transient.

Curve 64 illustrates the voltage V2 across switch 30 when capacitor 46 is connected across switch 30 with a value of 1000 pf, which is added to the parasitic capacitance of switch 30. The voltage rise is now much more gradual than when controlled by just the parasitic capacitance of switch 30. As a result, at initial turn off, when the current is relatively high, the voltage remains relatively low and by the time the voltage V2 rises to a large magnitude the current I through switch 30 has significantly decayed. As a result, the power loss in switch 30, which is determined by the product of voltage and current, is significantly reduced by the presence of capacitor 46.

A further advantage of the boost converter 10 is that switch 30 can be selected to provide a higher current capability than would be optimum in other circuit arrangements. The current capability of switch 30 determines the on resistance and hence the power loss during the steady state on period. It is of course desirable to select a switch 30 with a large maximum current capability to minimize the steady state voltage across the switch and hence the power dissipation during this interval. However, as the maximum current capability of switch 30 is increased, the parasitic capacitance across switch 30 also increases. In a conventional circuit this increased capacitance would result in increased transient switching power losses and a point would be reached where the benefit of further decreases in steady state power losses would be erased by even greater increases in transient switching losses.

However, because the boost converter 10 switches under low voltage and near zero voltage conditions, the switch 30 parasitic capacitance is not a limiting factor in selecting switch 30 and is actually desirable since it reduces the capacitance that must be supplied by capacitor 46. Selection of switch 30 can thus be based on cost considerations without being limited by parasitic capacitance across the drain and source of the switch.

Whereas the slow voltage rise time provided by capacitor 46 at turn off of switch 30 decreases power dissipation, capacitor 46 would be expected to increase power dissipation at switch 30 turn on. Capacitor 46 store energy in the amount of ½ $CV^2$, where C is the capacitance and V is the voltage across capacitor 46. This energy is dissipated through switch 30 and lost each time switch 30 is turned on. If V is the input voltage at terminal 22 and converter 10 switches at a high switching rate, the energy lost by inserting capacitor 46 would be substantial.

However, this penalty of increased power dissipation is avoided by using capacitor 46 to create the resonant circuit 14 that also includes inductor 18 and capacitor 40 or its equivalent storage capability within the input circuit that supplies power to the input terminals 22, 34.

Referring now to FIGS. 1 and 2, upon turn off of switch 30 at time 56, inductor 18 begins supplying current to the output terminal 24 and voltage smoothing capacitor 42 until the energy stored by inductor 18 during the switch 30 on part cycle has dissipated as indicated by time 66 in FIG. 2B. Starting at time 66 resonant circuit 14 begins to resonate at a predictable frequency determined by the values of inductor 18, capacitor 46 and the input capacitance represented by capacitor 40. Initially the output side of inductor 18 (junction 54) is at the output voltage and the input side of inductor 18 is at the lower input voltage, causing a reverse current to flow in inductor 18 while the voltage at junction 54 (which is also the voltage across switch 30) drops toward zero during interval 68. As this voltage reaches zero and would otherwise go negative, a diode built into the structure of switch 30 begins to conduct and clamps the voltage at zero during interval 70.

At the end of interval 70 the direction of current in inductor 18 reverses direction again to produce another resonant cycle that results in a second zero voltage interval 72. These zero voltage intervals 70, 72 would continue to occur periodically at predictable time intervals from time 66 when the voltage across and the current through inductor 18 first reverses direction except that control circuit 16 operates at time 74, which is during the second low voltage interval 72, to generate a positive transition in signal 50 and turn on switch 30 to initiate a new switching cycle.

Thus, by controlling the time of turn on in a manner to be explained more fully hereafter to coincide with low voltage interval 72, switch 30 is turned on under near zero voltage conditions to maintain the voltage across switch 30 and capacitor 46 clamped at near zero volts and minimal power is dissipated during the turn on transient. The low voltage across switch 30 minimizes power dissipation in switch 30 while the low voltage across capacitor 46 means that capacitor 46 stores minimal energy that must be dissipated through switch 30 and lost each time switch 30 is closed.

Control circuit 16 generates switch signal 50 to control switch 30 in response to the output voltage feedback signal 48, a switch current feedback signal 76 in the form of a voltage across current sense resistor 32 and a junction 54 voltage feedback signal 78 from a transformer winding 79 that is inductively coupled to inductor 18 and senses the voltage across inductor 18. Control circuit 16 responds to these feedback signals by controlling the on time and hence the duty cycle of switch 30 to maintain a predetermined output voltage at output terminal 24 and to turn switch 30 on during one of the low voltage resonance intervals 70, 72, which in this example is the second interval 72, but in general will vary somewhat from cycle to cycle. It will be appreciated that the switch 30 off time could be varied by turning on switch 30 during near zero interval 70 or during a near zero interval subsequent to interval 72 that would occur if switch 30 were not turned on during interval 72.

Control circuit 16 includes a pulse width modulation controller 80, which is a UC3842 integrated circuit manufactured by Unitrode, a timing delay and synchronization circuit 82 and an on time control circuit 84. Alternative duty cycle or pulse width control circuits could be used as well. The timing delay and synchronization circuit 82 includes two flip flops 90, 92, a filter capacitor 96, and a signal shaping circuit 98. Timing delay circuit 82 responds to junction voltage feedback signal 78 from winding 79 indicating that the inductor current has reversed to generate and communicate to the RC input of modulation controller 80 a signal commanding modulation controller 80 to produce a high voltage switch control signal 50 that turns on switch 30. Capacitor 96 imposes a selected small delay between the switching of transistor 110 and the actual clocking of flip flop 90 in response thereto.

Signal shaping circuit 98 includes an NPN transistor Q2 110 having its emitter connected to common and its collector coupled through a resistor R6 112 and a resistor R10 114 to the input voltage appearing on DC input terminal 22. At power turn on power to operate boost converter 10 is initially supplied from the DC input through resistor 114 and thereafter from the signal 78 generated by winding 79 through a rectifier and filter circuit 100 formed by capacitors 116, 118 and diodes 120 122.

As shown in FIG. 2C, the junction voltage feedback signal 78 developed by inductor winding 79 has a shape similar to the voltage across inductor 18 at junction 54 and hence switch 30 except that the voltage across inductor 18 is referenced to the input voltage at input terminal 22 while the feedback signal 78 is referenced to ground. While junction voltage feedback signal 78 is negative, diode D4 124 and resistor 126 clamp the base input of transistor 110 a diode voltage drop below ground to prevent the base of transistor 110 from receiving a negative voltage sufficient to break down the base-emitter junction of transistor 110.

As shown in FIG. 2D, transistor 110 operates as a saturating inverting amplifier and thus the collector voltage signal 128 of transistor 110, which is the clock input to the second flip flop 92, is a squared and inverted ground referenced replica of switch voltage feedback signal 78.

An externally generated clock signal 160, a switch closure enable signal 162 generated by the Q output of flip flop 90 and a switch closure command signal 164 generated by the Q (Q inverted) output of flip flop 92 are shown in FIGS. 2E, 2F and 2G, respectively. These signals operate to synchronize the cycles of the boost converter 10 with clock signal 160 generated by another device, which would typically be the load for which boost generator 10 is supplying power. In a typical situation the failure to synchronize boost converter 10 with the output load results in undesirable beat frequencies between boost converter 10 and the output load which in turn result in an unwanted ripple in the output of the load at the beat frequencies.

Boost converter 10 is designed to operate at a nominal cycle time that is approximately equal to the period of clock signal 160. Thus, by the time a pulse 170 occurs on clock signal 160, boost converter 10 should have completed the transfer of energy from inductor 18 to the output and should be ready to begin a new switching cycle. Flip flops 90, 92 are both set by switch signal 50 at the start of a switch cycle and flip flop 90 thereafter disables the start of the next switch cycle until it has been reset in response to clock signal 160. However, proper operation of boost converter 10 requires the switch signal 50 to go active high only during one of the low voltage periods 70, 72 that occur when voltage 58 at junction 54 resonates following the opening of switch 30 and the subsequent transfer of energy from inductor 18 to the output. The resetting of flip flop 90 by clock signal 160 thus serves only to enable a switch command and does not actually start a switch cycle.

Once flip flop 92 has been enabled by the resetting of flip flop 90 in response to a clock signal 160, the next resonant high to low transition 171 in the junction 54 voltage signal 58 (FIG. 2B) causes signal 128 at the collector of transistor 110 to go high at time 172 to clock flip flop 92, thereby resetting flip flop 92 and causing the Q output to generate a low to high transition 174 on signal 164 that drives the RC input to controller 80. Controller 80 responds to the transition 174 on the RC input signal by generating switch signal 50 to close switch 30, set flip flops 90, 92 and begin a new switch cycle.

As shown in FIG. 2C, a high to low transition at the base of transistor Q2 110 occurs when the voltage 78 across inductor L1 18 makes a high to low transition and approaches zero. The delays through transistor 110, flip flop 92 and controller 80 before gate signal 50 goes high, plus the added delay produced by capacitor C12 96 are designed to equal ¼ of the resonant period so that switch control signal 50 goes high when drain voltage 58 is at one of the zero or minimum voltage intervals 70, 72.

As shown in FIGS. 1 and 2H, signal 180 at the RC input to controller 80, which causes controller 80 to generate switch signal 50, is generated in one of two ways. A ramp generator 182 is formed by a reference voltage output, VR, from controller 80, resistor R1 184, ramping capacitor C4 186 and stabilizing capacitor C5 188 and resister R3 190. Resistor 190 has a low value and allows synchronizing pulse 174 of command signal 164 to be injected onto a ramp 192 formed by signal 180 at the RC input to controller 80. The VR output of controller 80 provides a reference voltage of approximately 5 volts, which is integrated by resistor 184 and capacitor 186 to form a ramp voltage 192 on signal 180. The RC input to controller 80 operates between two thresholds, an upper threshold TH and a lower threshold TL. When the voltage on ramp voltage signal 180 reaches upper threshold TH (as shown by the dashed line alternative 194 for signal 180) controller 80 discharges capacitor 186 through input RC at a rapid but controlled rate. When ramp signal 180 reaches the lower threshold TL controller 80 generates switch signal 50 and terminates the discharge of capacitor 186 to allow the voltage on ramp signal 180 at the RC to controller 80 to again ramp up toward the upper threshold TH.

Thus, in the first mode of operation boost converter 10 operates on fixed frequency cycles with predetermined time intervals with the active portion or duty cycle being varied in response to the output voltage at output terminal 24. However, the ramping time constant of resistor 184 and capacitor 186 are selected to provide a first mode switching period that is longer than the period of clock signal 160. Therefore, the boost converter normally operates in a second mode with a period slightly shorter than the period of the first mode. The positive going transition in signal 164 generated by the second flip flop 92 following a pulse on clock signal 160 and a low voltage period 70, 72 on junction voltage signal 58 produces a transition peak 196 on signal 180 that exceeds the upper threshold TH and causes controller 80 to initiate a new switching cycle and discharge capacitor 186. Boost converter 10 thus normally operates in a second mode having an average switching period that is shorter than the fixed switching interval of the first mode.

The "on" time control circuit 84 includes a voltage divider having resistors R9 130 and R7 132 which receive the output voltage feedback signal 48 from output load terminal 24, a resistor R8 134 and a pair of capacitors C8 136 and C7 138. Capacitors C8 136 and C7 138 and resistor RB 134 set the frequency response for the off transition switch control function. Controller 80 receives the divided output voltage feedback signal 48 at feedback input FB and internally compares this signal to an internal stable reference voltage to generate an error signal on output EA. A capacitor C6 140 and a resistor R2 142 integrate the current feedback signal 76 and thus form a ramp generator having a voltage at input IS of controller 80 that is responsive to the current sense feedback signal 76.

Capacitor 140 discharges through current sense resistor 32 while switch 30 is turned off and then forms a ramp signal as it integrates the current through switch 30 during the switch 30 "on" period. Controller 80 internally compares the ramp signal from charging capacitor 140 received at input IS to the internally generated output voltage error signal provided at output EA. When the current feedback ramp signal at input IS matches the output voltage feedback error signal at output EA, controller 80 brings switch control signal 50 low to turn off switch 30. Thus, as the output voltage at terminal 24 drops below the predetermined magnitude, the error signal increases and the integrated switch 30 current is allowed to reach a higher value before switch 30 is turned off. This stores more energy in inductor 18 and transfers more energy to the output during the "off" portion of the switch cycle to restore the output voltage to the preset desired magnitude. As the output voltage rises, the error signal decreases and switch 30 is turned off at a lower current level to maintain the output voltage at the preset magnitude. The boost converter 10 is thus operated in a feed back loop with current mode control to supply energy to output terminal 24 in response to the output voltage at terminal 24 and the actual switch 30 current sensed by current sense resistor 32.

A capacitor C3 146 is a decoupling capacitor that stabilizes the input voltage to controller 80. Resister R11 148 is coupled between the gate control output of controller 80 and the gate input to switch 30 to prevent oscillations in switch control signal 50.

In one example of a preferred embodiment of a boost converter 10 in accordance with the invention the input voltage is 120 volts, the output voltage is 380 volts and the boost converter 10 has a design capacity of at least 150 watts. At design capacity the peak switch current is 2.84 amps, the RMS switch current is 1.27 amps and the nominal switching frequency is 100 KHz. Switch 30 is a MOSFET switch having on resistance of about 0.55 ohm, a parasitic source drain capacitance of about 80 pF and a current fall time during the on to off transition of about 75 nsec.

Without capacitor 46, the junction 54 voltage 58 rise time at switch turn off would be about 40 nsec (signal 62 in FIG. 3) and the power dissipation due to turnoff would be about 2.27 watts. At turn on the power dissipation would be about 0.578 watt without synchronization to a resonant circuit as provided by the invention. The switch conduction loss is about 0.89 watt, making the total power dissipation about 3.74 watts without the improvements provided by this invention. Using a 1000 pF capacitor 46 and synchronizing the switch "on" transition to the resonance at the junction point, the turnoff power dissipation is reduced to about 0.35 watt and the turn on dissipation to near zero for a total decrease in power dissipation from 3.74 watts to 1.24 watts. With the employment of a 1000 pF capacitor 46, but without the use of synchronization to the junction point resonance, the power turn on dissipation alone would by 7.51 watts, which would more than negate the benefit of the capacitor during switch turnoff.

While there has been shown and described a particular arrangement of a boost converter in accordance with the invention for the purpose of enabling a person of ordinary skill in the art to make and use the invention, it should be appreciated that the invention is not limited thereto. Accordingly, any modifications, variations or equivalent arrangements within the scope of the accompanying claims should be considered to be within the scope of the invention.

In the following claims it is intended that a claim element not be interpreted under 35 U.S.C. § 112, paragraph 6, unless the claim element expressly recites a "means" or "step" for performing a specified function. It is further intended that any claim element that is interpreted under 35 U.S.C. § 112, paragraph 6 be broadly interpreted to encompass all disclosed embodiments and all equivalents thereof which perform the specified function.

What is claimed is:

1. A boost converter comprising:
   an input receiving electrical energy at a first voltage;
   an output providing electrical energy to a load at a second voltage greater in magnitude than the first voltage;
   an inductor coupled to the input;
   a rectifier coupled to the inductor at a junction and coupled to the output;
   a switch coupled between the junction and common;
   a resonant circuit coupled to generate a resonant voltage having a peak voltage and a low voltage at the junction following opening of the switch, the resonant circuit including the inductor and a capacitance coupled in parallel with the switch; and
   a control circuit coupled to the switch and controlling opening and closing of the switch, the control circuit being responsive to the voltage at the junction point and closing the switch during a portion of a resonant cycle when the junction voltage is not substantial.

2. A boost converter comprising:
   an input adapted to receive an input electrical voltage signal having a DC component having a first average magnitude;
   an output providing an electrical output voltage signal having an a DC component having a second average magnitude greater than the first average magnitude;
   an inductor having a first terminal coupled to the input and a second terminal;
   a rectifier having a first terminal coupled to the second terminal of the inductor and a second terminal coupled to the output;
   a switch coupled between the second terminal of the inductor and common;
   a resonant circuit that includes the inductor and a capacitance that is coupled in parallel with the switch, the resonant circuit producing a resonance between the inductor and the capacitance that causes a voltage at the second terminal of the inductor to vary and reduce the voltage at the second terminal of the inductor below the first average magnitude in response to a change in the switch from a conducting condition to a nonconducting condition at a time following the change from the conducting condition to the nonconducting condition of the switch; and
   a control circuit coupled to the switch and controlling the operation of the switch, the control circuit causing the switch to change from a nonconducting condition to a conducting condition at the predictable time.

3. A boost converter comprising:
   a switch that changes between a conducting condition and a nonconducting condition;
   a resonant circuit including an inductor having a first terminal coupled to a first voltage having a first average DC component and a second terminal coupled to a second voltage having a second average DC component, the second average DC component having a magnitude greater than the first average DC component, the second terminal of the inductor being further coupled to the switch, the resonant circuit becoming resonant in response to a change of the switch from a conducting condition to a nonconducting condition with the voltage at the second terminal of the inductor becoming less than the first average DC component following the change of the switch from the conducting condition to the nonconducting condition; and
   a control circuit coupled to the switch and controlling the operation of the switch, the control circuit causing the switch to change from a nonconducting condition to a conducting condition while voltage at the second terminal of the inductor is less than the first average DC component and causing the switch to change from a conducting condition to a nonconducting condition in response to the second voltage.

4. A boost converter comprising:
   a voltage boosting circuit receiving electrical energy from an input and supplying electrical energy to an output in response to the energy received at the input, the voltage boosting circuit including a switch controlling a transfer of energy from the input to the output by opening and closing during a sequence of switching cycles;
   a resonant circuit coupled to the voltage boosting circuit, the resonant circuit producing at least one instance of a low voltage across the switch during each switching cycle in response to the opening of the switch; and
   a control circuit coupled to the switch and controlling opening and closing of the switch during each switching cycle, the control circuit closing the switch during an instance of low voltage across the switch.

5. A boost converter according to claim 4, wherein the circuit includes an inductor, a rectifier and the switch coupled together at a junction and wherein the resonant circuit includes a capacitor coupled to the junction and coupled in parallel with the switch.

6. A boost converter according to claim 5, wherein the control circuit receives a junction voltage feedback signal that indicates voltage at the junction, an output voltage feedback signal that indicates a voltage at the output and a current feedback signal that indicates current through the switch and controls the opening and closing of the switch in response to the junction voltage feedback signal, the output voltage feedback signal, and the current feedback signal.

7. A boost converter according to claim 4, wherein the control circuit controls the switch with current mode control.

8. A boost converter according to claim 5, wherein the capacitor reduces power loss in the switch by slowing the rise time of voltage across the switch when the switch is turned off and power dissipation in the switch during a switch turn on transient is minimized by turning the switch on while the voltage across the switch is made low by a resonant voltage swing at the junction.

9. A boost converter according to claim 4, wherein the control circuit receives a clock signal and includes a synchronization circuit that operates in response to the clock signal to control the switch cycles synchronously with the clock signal.

10. A boost converter, the boost converter comprising:
an inductor coupled to a junction, the inductor conducting current between a boost converter input and the junction;
a rectifier coupled to the junction, the rectifier conducting current from the junction to a boost converter output;
an electronic switch coupled to the junction;
a resonant circuit coupled to generate a resonance having high and low voltages at the junction in response to opening of the switch, the resonant circuit including a capacitor coupled in parallel with the switch, the capacitance of the capacitor being sufficient to assure that current decay time of the switch is shorter than voltage rise time of the switch following switch turn off;
a winding inductively coupled to the inductor and generating a junction feedback signal that is indicative of the voltage at the junction;
a current sense resistor coupled to the switch and generating a current feedback signal that is indicative of current through the switch;
an output voltage feedback circuit that is coupled to the output and generates an output voltage feedback signal that is indicative of the voltage at the output; and
a control circuit coupled to the switch and controlling opening and closing of the switch, the control circuit receiving the junction feedback signal, the current feedback signal and the output voltage signal, the control circuit controlling opening and closing the switch in response to the junction feedback signal, the current feedback signal and the output voltage signal to maintain a switch duty cycle that maintains the voltage at the output at a predetermined magnitude and closes the switch during a portion of a resonant cycle when the junction voltage cyclically resonates to the low voltage.

11. A discontinuous inductor current mode boost converter, the boost converter comprising:
an input receiving electrical energy at a first voltage;
an output providing electrical energy to a load at a second voltage that is greater in magnitude than the first voltage;
an inductor coupled to the input and coupled to a junction, the inductor conducting current between the input and the junction;
a rectifier coupled to the junction and coupled to the output, the rectifier conducting current from the junction to the output;
an electronic switch coupled between the junction and common;
a resonant circuit coupled to generate a resonant voltage interval having high and low voltages at the junction following opening of the switch, the resonant circuit including a capacitor coupled in parallel with the switch, the capacitance of the capacitor being sufficient to assure that current decay time of the switch is shorter than voltage rise time of the switch following switch turn off;
a winding inductively coupled to the inductor and generating a junction feedback signal that is indicative of the voltage at the junction;
a clock input receiving a clock synchronization signal;
a current sense resistor coupled between the switch and common and generating a current feedback signal that is indicative of current through the switch;
an output voltage feedback circuit that is coupled to the output and generates an output voltage feedback signal that is indicative of the voltage at the output; and
a control circuit coupled to the switch and controlling opening and closing of the switch, the control circuit receiving the junction feedback signal, the clock synchronization signal, the current feedback signal and the output voltage signal, the control circuit controlling opening and closing the switch in response to the junction feedback signal, the clock synchronization signal, the current feedback signal and the output voltage signal to maintain a switch duty cycle that is synchronized with the clock synchronization signal, maintains the voltage at the output at a predetermined magnitude and closes the switch during a portion of a resonance interval when the junction voltage is near zero.

12. A boost converter having a capacity of at least 150 watts, the boost converter comprising:
an input receiving electrical energy at a first voltage of 120 volts;
an output providing electrical energy to a load at a second voltage of 380 volts that is greater in magnitude than the first voltage;
an inductor coupled to the input and coupled to a junction, the inductor conducting current between the input and the junction;
a rectifier coupled to the junction and coupled to the output, the rectifier conducting current from the junction to the output;
a MOSFET electronic switch coupled between the junction and common;
a resonant circuit coupled to generate resonant voltage cycles having peak and low voltages at the junction following opening of the switch, the resonant circuit including a capacitance coupled in parallel with the switch, the capacitance being sufficient to assure that following switch turnoff the switch current decays to substantially zero before the junction voltage reaches the output voltage;
a winding inductively coupled to the inductor and generating a junction feedback signal that is indicative of the voltage at the junction;

a clock input receiving a clock synchronization signal;

a current sense resistor coupled between the switch and common and generating a current feedback signal that is indicative of current through the switch;

an output voltage feedback circuit that is coupled to the output and generates an output voltage feedback signal that is indicative of the voltage at the output; and a control circuit coupled to the switch and controlling opening and closing of the switch, the control circuit receiving the junction feedback signal, the clock synchronization signal, the current feedback signal and the output voltage signal, the control circuit controlling opening and closing the switch in response to the junction feedback signal, the clock synchronization signal, the current feedback signal and the output voltage signal to maintain a switch duty cycle that is synchronized with the clock synchronization signal, maintains the voltage at the output at a predetermined magnitude and closes the switch during a portion of a resonant cycle when the junction voltage is near zero.

13. A method of boosting an input voltage to generate an output voltage greater in magnitude than the input voltage, the method comprising:

cyclically energizing an inductor in response to electrical energy received at the input voltage and in response to cyclical closing of a switch;

cyclically generating energy at the output voltage in response to energy received at the input voltage and in response to energy stored by the inductor;

placing a capacitance in parallel with the switch, the capacitance being sufficient to cause a voltage rise time across the switch to be longer than a decay time of current through the switch after the switch is opened;

creating a resonant circuit across the switch, the resonant circuit causing a voltage across the switch to resonate in a resonant interval of alternately high and low voltage in response to opening of the switch; and controlling the timing of closing of the switch to coincide with a resonant interval of low voltage across the switch.

14. A method of boosting an input voltage to generate an output voltage greater in magnitude than the input voltage using a circuit having an inductor coupled between an input and a junction, a rectifier coupled between the junction and an output and a switch coupled between the junction and common, the method comprising:

creating a resonant circuit, the resonant circuit including a capacitance coupled in parallel with the switch that has sufficient magnitude that when the switch is opened the voltage rise time across the switch is greater than current decay time for current through the switch, the resonant circuit causing a voltage across the switch to resonate during a resonant interval of alternately high and low voltages in response to opening of the switch; and cyclically opening and closing the switch with the switch being closed during a resonant interval at a time that coincides with a low voltage across the switch.

15. A method of boosting an input voltage to generate an output voltage greater in magnitude than the input voltage according to claim 14, further comprising:

sensing voltage at the output; and controlling a time interval during which the switch is closed in response to the voltage sensed at the output to maintain the voltage at the output at a selected magnitude.

16. A boost converter comprising:

an input receiving electrical energy at a first voltage;

an output providing electrical energy at a second voltage greater in magnitude than the first voltage;

an inductor coupled between the input and a junction;

a diode coupled between the junction and the output;

means for switching current coupled between the junction and common;

means for producing an electrical resonance at the junction, the electrical resonance producing means including the inductor and a capacitor connected in parallel with the switching means that is in addition to any parasitic capacitance of the switching means, the resonance producing high and low voltage intervals at the junction; and means for controlling the means for switching, the means for controlling cyclically opening and closing the switch to maintain a predetermined voltage at the output with the closure of the switching means occurring during an interval of low voltage at the junction.

17. A boost converter according to claim 16, wherein the capacitor has sufficient capacitance that when the means for switching current is opened, the voltage rise time of voltage across the means for switching current is longer than the current decay time for current through the means for switching current, wherein the means for switching includes a single switch, and wherein the resonance producing means produces alternating directions of current flow through the inductor.

18. A boost converter comprising:

an input receiving electrical energy at a first voltage;

an output providing electrical energy at a second voltage greater in magnitude than the first voltage;

an inductor coupled between the input and a junction, the inductor having a forward current direction that conducts current from the input to the junction and a reverse current direction that conducts current from the junction to the input;

a diode coupled between the junction and the output;

a switch coupled between the junction and common, the switch conducting current when turned on and blocking current when turned off;

a capacitance coupled between the junction and common, the capacitance being sufficient to produce an electrical resonance between the capacitance and the inductor that produces a reverse current in the inductor and reduces the voltage at the junction below the first voltage at the input in response to opening of the switch; and a control circuit coupled to the switch and cyclically turning the switch on and off, the switch being turned on while the voltage at the junction is below the first voltage at the input.

19. A boost converter according to claim 18, wherein the control circuit is coupled to the output and controls an interval between turning on the switch and turning off the switch in response to the second voltage at the output.

20. A boost converter comprising:

an input receiving electrical energy at a first voltage;

an output providing electrical energy at a second voltage greater in magnitude than the first voltage;

an inductor coupled between the input and a junction, the inductor having a forward current direction that conducts current from the input to the junction and a reverse current direction that conducts current from the junction to the input;

a diode coupled between the junction and the output;

a single switch coupled between the junction and common, the single switch conducting current when turned on and blocking current when turned off;

a capacitance coupled between the junction and common, the capacitance being sufficient to produce an electrical resonance that produces a reverse current in the inductor and reduces the voltage at the junction below the first voltage at the input in response to opening of the single switch; and a control circuit coupled to the single switch and cyclically turning the single switch on and off, the single switch being turned on while the voltage at the junction is below the first voltage at the input.

21. A boost converter according to claim 18, wherein the control circuit is coupled to the output and controls an interval between turning on the single switch and turning off the single switch in response to the second voltage at the output.

* * * * *